US011612107B2

(12) United States Patent
Duquesne et al.

(10) Patent No.: US 11,612,107 B2

(45) Date of Patent: Mar. 28, 2023

(54) CHOPPER ARRANGEMENT FOR AN AGRICULTURAL HARVESTER

(71) Applicant: CNH Industrial America LLC, New Holland, PA (US)

(72) Inventors: Frank R. G. Duquesne, Zwevegem (BE); Jolan Heyns, Oostkamp (BE); Tim Passchyn, Sint-Michiels (BE); Gilles Mommerency, Oostnieuwkerke (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 17/743,200

(22) Filed: May 12, 2022

(65) Prior Publication Data

US 2022/0361412 A1 Nov. 17, 2022

(30) Foreign Application Priority Data

May 12, 2021 (EP) .................................... 21173692

(51) Int. Cl.
*A01F 12/40* (2006.01)
*A01F 29/04* (2006.01)
(Continued)

(52) U.S. Cl.
CPC .............. *A01F 12/40* (2013.01); *A01D 90/04* (2013.01); *A01F 29/04* (2013.01); *A01F 29/02* (2013.01)

(58) Field of Classification Search
CPC .......... A01F 12/40; A01F 29/04; A01F 29/02; A01D 90/04
See application file for complete search history.

(56) References Cited

U.S. PATENT DOCUMENTS

| | | | |
|---|---|---|---|
| 1,191,853 | A | 7/1916 | Thompson |
| 2,064,689 | A | 12/1936 | Russwurm et al. |

(Continued)

FOREIGN PATENT DOCUMENTS

| | | | | | |
|---|---|---|---|---|---|
| AT | 377412 | B * | 3/1985 | ............. | A01D 90/04 |
| DE | 3034404 | A1 * | 5/1982 | ............. | A01D 90/04 |

(Continued)

OTHER PUBLICATIONS

Extended European Search Report for EP Application No. 21173692.1 dated Dec. 13, 2021 (5 pages).

*Primary Examiner* — Arpad F Kovacs

(74) *Attorney, Agent, or Firm* — Peter K. Zacharias; Patrick M. Sheldrake

(57) ABSTRACT

A chopper arrangement for an agricultural harvester, having a housing and a plurality of rotatable knife rows in the housing. The chopper arrangement includes a counter knife arrangement including a first counter knife bank and a second counter knife bank downstream of the first counter knife bank. The counter knife arrangement is movable between an engaged position, in which the first and second counter knife banks at least partially overlap the plurality of rotatable knife rows, and a disengaged position, in which the first and second counter knife banks are retracted away from the plurality of rotatable knife rows. The counter knife arrangement also includes a mechanical linkage coupling the first counter knife bank to the second counter knife bank to provide for simultaneous movement of the first and second counter knife banks upon actuation of the counter knife arrangement between the engaged and disengaged positions.

15 Claims, 2 Drawing Sheets

(51) Int. Cl.
*A01D 90/04* (2006.01)
*A01F 29/02* (2006.01)

(56) References Cited

U.S. PATENT DOCUMENTS 2,626,159 A 1/1953 Thompson
2,670,775 A * 3/1954 Elofson .................. A01F 12/40 239/650
2,842,175 A 7/1958 Thompson
4,955,188 A * 9/1990 von Allworden ...... A01D 90/04 100/6
5,503,339 A 4/1996 Doppstadt
5,911,375 A 6/1999 Isfort
6,231,439 B1 5/2001 Heidjann
7,510,472 B1 * 3/2009 Farley .................... A01D 90/04 460/112
7,862,413 B2 * 1/2011 Isaac ...................... A01F 12/40 460/112
7,993,187 B2 * 8/2011 Ricketts .................. A01F 12/40 56/10.2 J
10,575,471 B2 3/2020 Faulkner et al.
2010/0291982 A1 11/2010 Isaac et al.
2014/0179383 A1 * 6/2014 Isaac ...................... A01F 12/40 460/112
2014/0326815 A1 * 11/2014 Dilts ...................... B02C 23/24 241/238
2015/0038201 A1 2/2015 Brinkmann et al.
2016/0007537 A1 * 1/2016 Dilts ...................... A01F 29/02 460/112
2017/0099771 A1 4/2017 Linde et al.
2017/0099778 A1 4/2017 Dilts et al.
2020/0305352 A1 10/2020 Bussmann et al.

FOREIGN PATENT DOCUMENTS

DE 3141414 A1 * 5/1983 ............ A01D 90/04
DE 3405467 A1 * 1/1985 ............ A01D 90/04
EP 0028395 A1 * 5/1981 ............ A01D 90/04
EP 0077474 A1 4/1983
EP 0167903 A1 * 1/1986 ............ A01D 90/04
EP 0341508 A1 11/1989
EP 595882 B2 4/1996
EP 1232683 A1 8/2002
EP 1738636 A2 1/2007
EP 1884155 A1 2/2008
EP 2752109 A2 7/2014
EP 2798943 A1 11/2014
EP 2837280 A1 2/2015
EP 2965615 A1 1/2016
EP 3150060 A1 4/2017
EP 3153010 A1 4/2017
GB 2095638 A * 10/1982 ............ A01D 90/04
JP 2001178250 A 7/2001
WO 93/01708 A1 2/1993

* cited by examiner

CHOPPER ARRANGEMENT FOR AN AGRICULTURAL HARVESTER

TECHNICAL FIELD

The present invention relates to a chopper arrangement for an agricultural harvester and, in particular, to a chopper arrangement having first and second mechanically-coupled counter knife banks.

BACKGROUND

An agricultural harvester such as a combine harvester or 'combine' performs multiple harvesting functions with a single harvesting unit, such as picking, threshing, separating and cleaning. A combine includes a header, which removes the crop from a field, and a feeder housing which transports the crop matter into a threshing rotor. The threshing rotor rotates within a perforated housing, which may be in the form of adjustable concaves and performs a threshing operation on the crop to remove the grain. Once the grain is threshed it falls through perforations in the concaves onto a grain pan. From the grain pan the grain is cleaned using a cleaning system, and is then transported to a grain tank on-board the combine. A cleaning fan blows air through the sieves to discharge chaff and other debris toward the rear of the combine. Non-grain crop material such as straw from the threshing section proceeds through a residue system, which may utilise a straw chopper to process the non-grain material and direct it out the rear of the combine. When the grain tank becomes full, the combine is positioned adjacent to a vehicle into which the grain is to be unloaded, such as a semi-trailer, gravity box, straight truck, or the like; and an unloading system on the combine is actuated to transfer the grain into the vehicle.

More particularly, a threshing or separating system includes one or more rotors which can extend axially (front to rear) or transversely within the body of the combine, and which are partially or fully surrounded by a perforated concave. The crop material is threshed and separated by the rotation of the rotor within the concave. Coarser non-grain crop material such as stalks and leaves are transported to the rear of the combine through a chopper assembly or arrangement and discharged back to the field using a spreader system. The separated grain, together with some finer non-grain crop material such as chaff, dust, straw, and other crop residue are discharged through the concaves and fall onto a grain pan where they are transported to a cleaning system. Alternatively, the grain and finer non-grain crop material may also fall directly onto the cleaning system itself.

After passing through the threshing and separating system, the coarse non-grain crop material can flow into the chopper arrangement to be cut into finer pieces before being thrown to a spreader to be spread on the field. Chopping the non-grain crop material into finer pieces increases the surface area of the crop material, allowing for quicker decomposition. One type of chopper arrangement that is commonly used has multiple moving knives—in particular, a plurality of knife rows disposed in a housing and rotating about an axis—that cooperate with stationary counter knives to chop the crop material into finer pieces. A shear bar can also be placed after the stationary counter knives to impede the flow of the crop material through the chopper arrangement and increase the chop quality or intensity.

In known chopper arrangements the bank or row of stationary counter knives can be moved relative to the housing to engage or disengage the counter knives with the rotating knives to perform different degrees of chopping of the crop material. In particular, the bank of counter knives may be inserted further into the housing to increase a degree of overlap between the counter knives and the rotating knives to increase a level of chopping performed on the crop material. On the other hand, the bank of counter knives may be retracted away from the rotating knives and out of the housing to decrease the degree of overlap between the counter knives and the rotating knives to reduce the level of chopping performed on the crop material, or to eliminate chopping completely.

The chopper arrangement on a combine harvester, such as the one described above, can take up a significant amount of power, for instance up to 30% of the power available to the harvester, which contributes to a significant amount of fuel consumption and can limit the capacity of the harvester. Also, the counter knives of known chopper arrangements can suffer from extensive wear, which can reduce the quality of chopping performed on crop material and necessitate expensive replacement of the counter knives.

It is against this background to which the present invention is set.

SUMMARY OF THE INVENTION

According to an aspect of the present invention there is provided a chopper arrangement for an agricultural harvester. The chopper arrangement is for performing chopping on crop material processed by the agricultural harvester. The chopper arrangement comprises a housing, and a plurality of rotatable knife rows in the housing, the plurality of rotatable knife rows being rotatable about an axis to move crop material in the housing along a crop flow path. The chopper arrangement comprises a counter knife arrangement comprising a first counter knife bank and a second counter knife bank downstream of the first counter knife bank according to the crop flow path. The counter knife arrangement is movable between an engaged position, in which the first and/or second counter knife banks at least partially overlap the plurality of rotatable knife rows, and a disengaged position, in which the first and second counter knife banks are retracted away from the plurality of rotatable knife rows. The counter knife arrangement further comprises a mechanical linkage coupling the first counter knife bank to the second counter knife bank to provide for simultaneous movement of the first and second counter knife banks upon actuation of the counter knife arrangement between the engaged and disengaged positions.

The term 'overlap' refers to the degree of engagement of the first or second counter knife banks with the plurality of rotatable knife rows. In particular, the counter knives can be inserted between the rotating knives so that the counter knives intersect the rotating knives. The degree to which the counter knives are inserted into the rotating knives determines the degree of overlap or engagement of the counter knives with the rotating knives.

The mechanical linkage may comprise a first bracket fixedly attached to the first counter knife bank and pivotably attached to the housing. The mechanical linkage may comprise a second bracket fixedly attached to the second counter knife bank and pivotably attached to the housing. The first and/or second brackets may be arranged to pivot relative to the housing upon actuation of the counter knife arrangement between the engaged and disengaged positions.

The mechanical linkage may comprise an elongate connector having a first connector end and a second connector end opposite the first connector end. The elongate connector may be pivotably attached to the first bracket at the first connector end and may be pivotably attached to the second bracket at the second connector end to provide for relative rotational movement between the first and second brackets upon actuation of the counter knife arrangement between the engaged and disengaged positions.

The chopper arrangement may comprise an actuating arm pivotably attached to the housing. The actuating arm and the first bracket may be pivotably attached to the housing at a common pivot point, wherein actuation of the actuating arm about the common pivot point may cause actuation of the first bracket about the common pivot point to move the counter knife arrangement between the engaged and disengaged positions.

The actuating arm may include a first actuating arm at a first side of the first and second counter knife banks and a second actuating arm at a second side of the first and second counter knife banks opposite the first side.

A remotely controlled actuator or an operator may rotate the actuating arm.

In the engaged position of the counter knife arrangement, a degree of overlap between the first counter knife bank and the plurality of rotatable knife rows may be greater than a degree of overlap between the second counter knife bank and the plurality of rotatable knife rows.

In some embodiments, in a first range of positions of the counter knife arrangement between first and second intermediate positions of the counter knife arrangement, the first and second intermediate positions being between the engaged and disengaged positions, the first counter knife bank partially overlaps the plurality of rotatable knife rows and the second counter knife bank does not overlap the plurality of rotatable knife rows.

In some embodiments, in a second range of positions of the counter knife arrangement between the second intermediate position and the engaged position of the counter knife arrangement, the second intermediate position being between the first intermediate position and the engaged position, the second counter knife bank at least partially overlaps the plurality of rotatable knife rows.

In some embodiments, in the second intermediate position a degree of overlap between the first counter knife bank and the plurality of rotatable knife rows is less than 50%, optionally less than 25%.

An angle of overlap between the first counter knife bank and the plurality of rotatable knife rows may be different for different positions of the counter knife arrangement. The angle of overlap is the acute angle between the knives of the counter knife bank and the knives of a rotatable knife row when the knives of the counter knife bank and the knives of the rotatable knife row overlap.

The angle of overlap between the first counter knife bank and the plurality of rotatable knife rows may be smallest when the counter knife arrangement is in the engaged position.

The angle of overlap between the first counter knife bank and the plurality of rotatable knife rows may be different from an angle of overlap between the second counter knife bank and the plurality of rotatable knife rows in a given position of the counter knife arrangement.

According to another aspect of the present invention there is provided an agricultural harvester comprising a chopper arrangement as described above.

According to another aspect of the present invention there is provided a method of operating a chopper arrangement for an agricultural harvester, the chopper arrangement comprising a counter knife arrangement having first and second counter knife banks that are mechanically coupled together, the counter knife arrangement being movable between an engaged position, in which the first and second counter knife banks at least partially overlap a plurality of rotatable knife rows of the chopper arrangement, and a disengaged position, in which the first and second counter knife banks are retracted away from the plurality of rotatable knife rows, the method comprising actuating the chopper arrangement to control a degree of chopping performed on crop material processed by the agricultural harvester, wherein actuation of the chopper arrangement causes simultaneous movement of the first and second counter knife banks between the engaged and disengaged positions.

BRIEF DESCRIPTION OF THE DRAWINGS

One or more embodiments of the invention will now be described, by way of example only, with reference to the accompanying drawings, in which.

DETAILED DESCRIPTION

Figure 1:
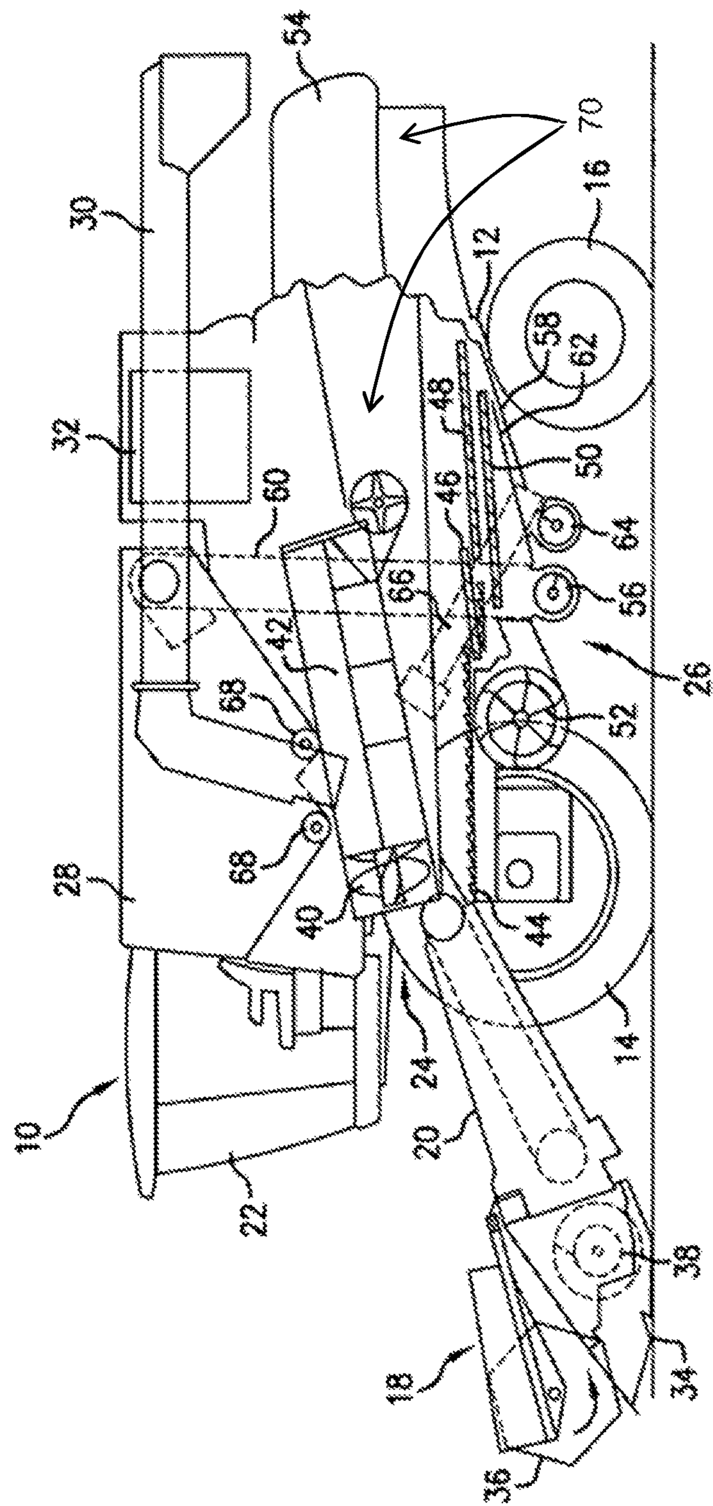
FIG. 1 is a side view of an agricultural harvester according to an aspect of the invention; and, FIG. 2 is a schematic side view of a chopper arrangement of the agricultural harvester of FIG. 1.

FIG. 1 shows an agricultural harvester in the form of a combine 10, which generally includes a chassis 12, ground engaging wheels 14 and 16, a header 18, a feeder housing 20, an operator or driver cab 22, a threshing and separating system 24, a cleaning system 26, a grain tank 28, and an unloading auger 30.

The front wheels 14 are larger flotation type wheels, and rear wheels 16 are smaller steerable wheels. Motive force is selectively applied to the front wheels 14 through a power plant in the form of an engine 32 and a transmission (not shown). Although the combine 10 is shown as including wheels, it is also to be understood that the combine 10 may include tracks, such as full-tracks or half-tracks.

The header 18 is mounted to the front of the combine 10 and includes a cutter bar 34 for severing crops from a field during forward motion of combine 10. A rotatable reel 36 feeds the crop into the header 18, and a double auger 38 feeds the severed crop laterally inwardly from each side toward the feeder housing 20. The feeder housing 20 conveys the cut crop to the threshing and separating system 24, and is selectively vertically movable using appropriate actuators, such as hydraulic cylinders (not shown).

The threshing and separating system 24 is of the axial-flow type, and generally includes a rotor 40 at least partially enclosed by and rotatable within a corresponding perforated concave 42. The cut crops are threshed and separated by rotation of the rotor 40 within the concave 42, and larger elements, such as stalks, leaves and the like are discharged from the rear of the combine 10. Smaller elements of crop material including grain and non-grain crop material, including particles lighter than grain, such as chaff, dust and straw, are discharged through perforations of the concave 42. The threshing and separating system 24 can also be a different type of system, such as a system with a transverse rotor rather than an axial rotor.

Grain which has been separated by the threshing and separating assembly 24 falls onto a grain pan 44 and is conveyed toward the cleaning system 26. The cleaning system 26 may include a pre-cleaning sieve 46, an upper sieve 48 (also known as a chaffer sieve), a lower sieve 50 (also known as a cleaning sieve), and a cleaning fan 52.

Grain on the sieves 46, 48 and 50 is subjected to a cleaning action by a fan 52 which provides an air flow through the sieves to remove chaff and other impurities such as dust from the grain by making this material airborne for discharge from the straw hood 54 of the combine 10. The grain pan 44 and pre-cleaning sieve 46 oscillate in a fore-aft manner to transport the grain and finer non-grain crop material to the upper surface of the upper sieve 48. The upper sieve 48 and the lower sieve 50 are vertically arranged relative to each other, and likewise oscillate in a fore-aft manner to spread the grain across the sieves 48, 50, while permitting the passage of cleaned grain by gravity through the openings of the sieves 48, 50.

Clean grain falls to a clean grain auger 56 positioned crosswise below and toward the front of the lower sieve 50. The clean grain auger 56 receives clean grain from each of the sieves 48, 50 and from the bottom pan 58 of the cleaning system 26. The clean grain auger 56 conveys the clean grain laterally to a generally vertically arranged grain elevator 60 for transport to the grain tank 28. Tailings from the cleaning system 26 fall to a tailings auger trough 62. The tailings are transported via the tailings auger 64 and the return auger 66 to the upstream end of the cleaning system 26 for repeated cleaning action. A pair of grain tank augers 68 at the bottom of the grain tank 28 conveys the clean grain laterally within the grain tank 28 to the unloading auger 30 for discharge from the combine 10.

The combine 10 includes a residue handling system 70 which can be located at different positions within the combine 10, but is positioned such that it can receive material other than grain (MOG) after grain has been removed by the threshing and separating system 24. For instance, the residue handling system 70 can be mounted to a so-called high hood or straw hood of the combine 10, such as at a lower rear portion of the straw hood.

Figure 2:
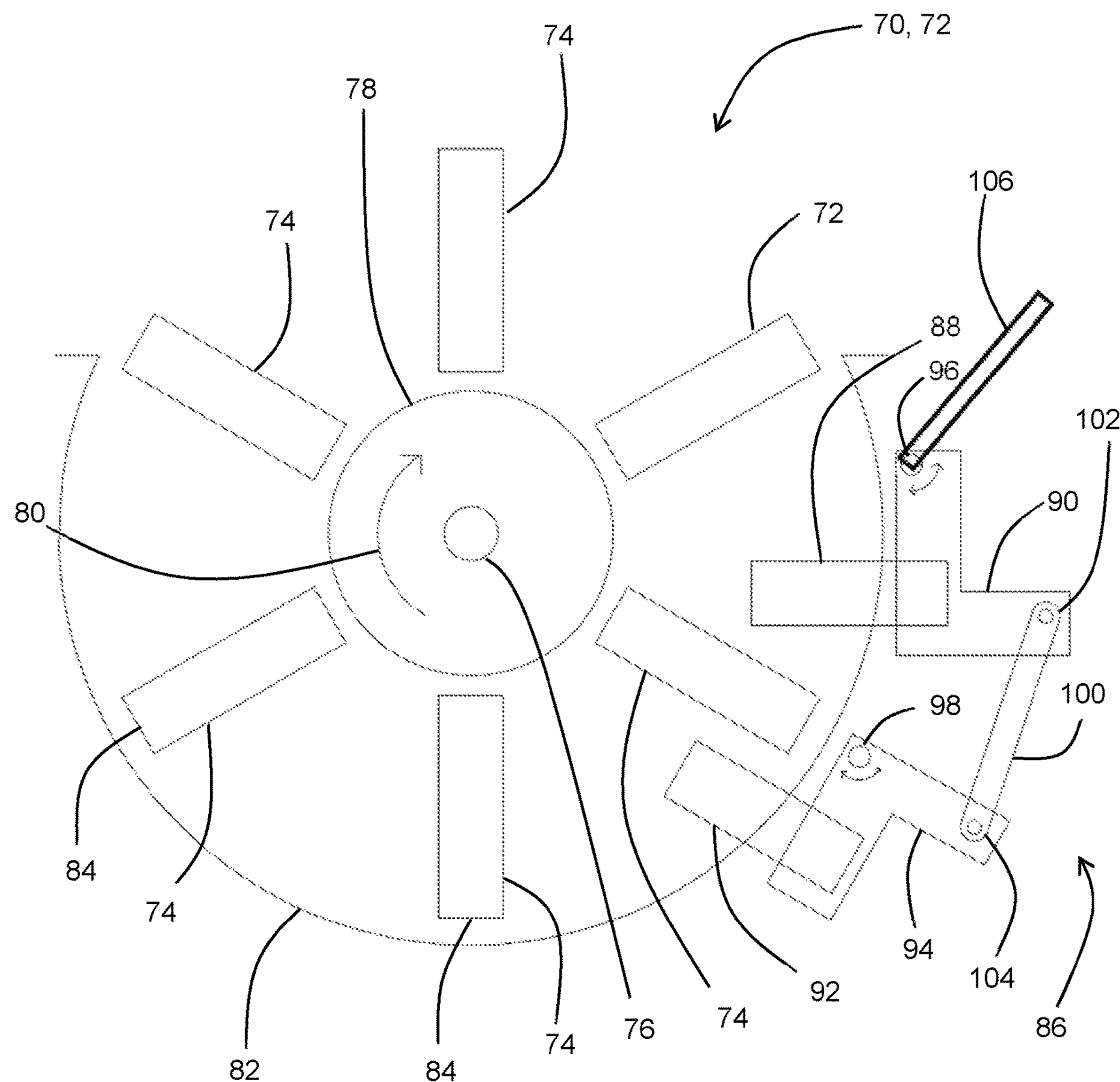

With reference to FIG. 2, the residue handling system 70 includes a chopper arrangement 72 for performing chopping on crop material processed by the combine 10, in particular to chop straw into smaller pieces to be spread on the field. The chopper arrangement 72 includes a number of knife rows 74 disposed, and equally spaced, about an axis 76 defined by a rotatable shaft 78, with each knife row 74 extending radially from the axis 76. In the described example, six knife rows 74 are shown; however, the chopper arrangement 72 may include any suitable number of knife rows 74. The knife rows 74 are rotatable about the axis 76 in a rotational direction 80. Each of the knife rows 74 includes outwardly-projecting knives along the length of the shaft 78.

The plurality of knife rows 74 and shaft 78 are disposed within a generally circular housing 82, having a radius centred at the axis 76 and a radius substantially equal to, or slightly greater than, a radius of curvature defined by the distal ends 84 of the plurality of knife rows 74 when the knife rows rotate about the axis 76. The housing 82 is arranged to receive crop material downstream of the threshing and separating system 24, and the rotation of the knife rows 74 causes the knives in the knife rows 74 to sweep or drag the crop material along a crop flow path and eventually towards an exit of the housing 82. The housing 82, shaft 78 and each of the plurality of knife rows 74 extend transversely relative to a driving direction—i.e. axial or front-to-rear direction—of the combine 10.

The chopper arrangement 72 also includes a counter knife arrangement 86 adjacent to the housing 82. The counter knife arrangement 86 includes a first bank 88 of counter knives fixedly attached to a first bracket 90, and a second bank 92 of counter knives fixedly attached to a second bracket 94. The first bracket 90 is pivotably attached to the housing 82 at pivot point 96, and the second bracket 94 is pivotably attached to the housing 82 at pivot point 98. Like the plurality of knife rows 74, the counter knife banks 88, 92 extend transversely relative to the driving direction of the combine 10.

The counter knife arrangement 86 also includes a mechanical coupling component 100 for mechanically coupling the first and second counter knife banks 88, 92 together or, more particularly, mechanically coupling the first and second brackets 90, 94 together. In the described example, the mechanical coupling is in the form of an elongate connector 100 in which a first end 102 thereof is pivotably attached to the first bracket 90 and a second end 104 thereof is pivotably attached to the second bracket 94. This allows relative movement, in particular relative rotational and translational movement, between the first bracket 90 (and first counter knife bank 88) and the second bracket 94 (and second counter knife bank 92).

The direction of flow of crop material in the housing 82 is defined by the rotational direction 80 of the shaft 78 and plurality of knife rows 74, and the second counter knife bank 92 is positioned downstream of the first counter knife bank 88 according to the crop flow direction in the housing (or according to the rotational direction 80 of the knife rows 74). The spacing between the first and second counter knife banks 88, 92 around the housing 82 may be any suitable amount, i.e. how far downstream the second counter knife bank 92 is relative to the first counter knife bank 88 may be any suitable amount. However, it is noted that the greater the spacing the greater the length that the mechanical coupling component 100 needs to be. This could impact on a degree of control that is possible for causing simultaneous movement of the first and second counter knife banks 88, 92 by a single actuator, or single point of actuation, for the chopper arrangement 86.

The counter knife arrangement 86 is movable relative to the rest of the chopper arrangement 72, in particular relative to the housing 82. In the described example, the chopper arrangement 72 includes an actuating arm 106 that is attached at one end to the pivot point 96 so that the actuating arm 106 is pivotable about the pivot point 96. That is, the first bracket 90 of the counter knife arrangement 86 and the actuating arm 106 are pivotably attached to the common pivot point 96 such that the actuating arm 106 is mechanically coupled to the counter knife arrangement 86. In this way, rotation of the actuating arm 106 causes actuation or movement of the counter knife arrangement 86, as will be discussed in greater detail below. The actuating arm 106 may be actuated about the pivot point 96 in any suitable manner. For instance, a hydraulic or electrical actuator may be provided to cause rotation of the actuating arm 106 about the pivot point 106. Such an actuator may be controlled automatically by a control system of the combine 10, or may be controlled in response to operator input to such a control system. Further alternatively, the actuating arm 106 may simply be actuated manually by an operator.

The counter knife arrangement 86 is movable between so-called 'disengaged' and 'engaged' positions or configurations. In a disengaged position of the counter knife arrangement 86 the first and second counter knife banks 88, 92 do not overlap the plurality of knife rows 74 at all and are retracted outside of, or away from, the housing 82. This means that, in the disengaged position, there is no chopping performed on crop material swept along the crop flow path by rotation of the knife rows 74 because there is no engagement of the knife rows with either the first or second counter knife banks. Expressed differently, in the disengaged position the knives of the plurality of knife rows do not intersect the knives of either of the first or second counter knife banks when rotating about the axis 76, and so chopping of crop material is not performed.

Unlike in the disengaged position, in an engaged position of the counter knife arrangement 86 the first and second counter knife banks 88, 92 are inserted into the housing 82 and overlap, at least partially, with the plurality of rotating knife rows 74, in use. This means that, in the engaged position, chopping is performed on crop material swept along the crop flow path by rotation of the knife rows 74 as the crop material is dragged past the first knife bank 88 and the second knife bank 92. That is, in the engaged position the plurality of knife rows intersect the knives of the first and second counter knife banks, at least to some extent, when rotating about the axis 76, and this intersection causes chopping of crop material to be performed. The level or amount of engagement refers to an amount of insertion of the first or second counter knife banks 88, 92 in a radial direction relative to the axis 76, i.e. a greater amount of insertion in the radial direction means a greater degree of engagement, which in turn may cause a greater intensity of chopping.

In the described example, in the engaged position of the counter knife arrangement 86 the knives of the first counter knife bank 88 fully overlap, or completely engage with, the knives of the plurality of knife rows 74 as they rotate about the axis 76. That is, the knives of the first counter knife bank 88 are inserted fully into the spaces between the knives of the plurality of knife rows 74 as they rotate past, and intersect with, the knives of the first counter knife bank 88. In contrast, the knives of the second counter knife bank 92 partially overlap, or engage with, the knives of the plurality of knife rows 74 as they rotate about the axis 76. That is, the knives of the second counter knife bank 92 are inserted to some extent, but not fully, into the spaces between the knives of the plurality of knife rows 74 as they rotate past, and intersect with, the knives of the second counter knife bank 92. In the engaged position the first counter knife arrangement 88 can be described as being 100% engaged whereas the second counter knife arrangement 92 is less than 100% engaged, for instance greater than 50% engaged or, in one example, approximately 75% engaged. In different examples, in the engaged position both the first and second counter knife bank may only partially overlap the plurality of rotatable knife rows. In further different examples, in the engaged position the second counter knife bank fully overlaps the plurality of rotatable knife rows whereas the first counter knife bank only partially overlap the plurality of rotatable knife rows.

When the counter knife arrangement 86 is in the disengaged position, in order to move the counter knife arrangement 86 to the engaged position the arm 106 is actuated by the actuator, e.g. a hydraulic actuator. The resulting rotation of the arm 106 about the pivot point 96 causes rotation of the first bracket 90 about the pivot point 96. In particular, as viewed in FIG. 2, the first bracket 90 rotates clockwise about the pivot point 96 so that the first counter knife bank 88 is inserted into the housing 82 until the first counter knife bank 88 is fully engaged with the rotating knife rows 74. Rotation of the first bracket 90 about the pivot point 96 also causes relative rotation between the first bracket 90 and the mechanical connector 100 about the pivot point 102. In particular, movement of the first bracket 90 causes movement of the mechanical connector 100, which in turn causes relative rotation between the mechanical connector 100 and the second bracket 94 about the pivot point 104. Specifically, the movement of the mechanical connector 100 causes the second bracket 94 to rotate about the pivot point 98. As viewed in FIG. 2, the second bracket 94 rotates clockwise about the pivot point 98 so that the second counter knife bank 92 is inserted into the housing 82 until the first counter knife bank 88 is fully engaged with the rotating knife rows 74 (in which position the second counter knife bank 92 partially engages with the plurality of rotatable knife rows 74, in the described example). Similarly, in order to move the counter knife arrangement 86 to the disengaged position from the engaged position the arm 106 is actuated to rotate about the pivot point 96 in the opposite direction, which causes the reverse or opposite movement of the counter knife arrangement 86 described above. Note, therefore, that actuation of the actuating arm 106 causes simultaneous movement of the first and second counter knife banks 88, 92.

From the disengaged position to a first intermediate position of the counter knife arrangement 86 there is a range of positions of the counter knife arrangement 86 in which both the first and second counter knife banks 88, 92 are (completely) disengaged from the plurality of rotating knife rows 74. Then, from the first intermediate position to a second intermediate position of the counter knife arrangement 86 there is a (first) range of positions in which the first counter knife bank 88 partially engages with, or overlaps, the plurality of rotating knife rows 74—where the degree of overlap increases from the first intermediate position to the second intermediate position—and the second counter knife bank 92 remains disengaged from the plurality of rotating knife rows 74. Then, from the second intermediate position to the engaged position of the counter knife arrangement 86 there is a (second) range of positions in which both the first and second counter knife banks 88, 92 partially engage with, or overlap, the plurality of rotating knife rows 74—where the degree of overlap for each of the first and second counter knife banks 88, 92 increases from the second intermediate position to the engaged position (in which position the first counter knife bank 88 is fully engaged, in the described example). In the second intermediate position the first counter knife bank 88 may be less than 50% engaged—in one example, approximately 40% engaged—or optionally less than 25% engaged—in another example, approximately 20% engaged.

When the knives of the first or second counter knife banks 88, 92 intersect the knives of one of the plurality of knife rows 74 then an angle is formed between the intersecting knives. As actuation of the counter knife arrangement 86 involves rotational movement of both the first or second counter knife banks 88, 92 then the angle of intersection between the first or second counter knife banks 88, 92 with the rotating knife rows 74 may be different for different positions of the counter knife arrangement 86. In particular, as the counter knife arrangement 86 gets closer to the engaged position the intersection angle decreases for both the first and second counter knife banks 88, 92. In the described example the angle formed between the first counter knife bank 88 and the rotating knife rows 74 is different from the angle formed between the second counter knife bank 92 and the rotating knife rows 74 in a given position of the counter knife arrangement 86; in different examples, this need not be the case.

Although the invention has been described with reference to a combine harvester, the invention is applicable to any suitable agricultural harvester having a chopper arrangement for performing chopping of crop material. It is noted that the chopper arrangement of the present invention can be controlled manually by an operator, for instance using a control input from a cab of the harvester, or automatically by a control system of the harvester, for instance in response to a determined desired quality of chopping to be performed on the crop material being processed.

In the example described above, the first bracket, second bracket, mechanical connector and actuating arm are located at one side of the transversely-extending housing and banks of counter knives. It is envisaged, however, that in some examples two of each of these elements are provided; one of each element at either side of the counter knife banks. In this way, actuation of the counter knife banks can be caused by simultaneously actuating the brackets are either side of the counter knife banks by simultaneously actuating arms at either end of the housing and counter knife banks. This can be beneficial to spread the load and to guard against twisting of the counter knife banks.

In the above-described embodiment, the chopper is a rear- or hood-mounted chopper. In different embodiments, however, an agricultural harvester can additionally or alternatively have a chopper at a different location of the combine. For instance, an agricultural harvester can be provided with an integral chopper located within the chassis or straw hood. It is to be understood that the present invention is applicable to harvesters that have a chopper at any suitable position, such as a rear/hood chopper arrangement or an integral chopper arrangement.

In the described example, the knives of the first and second counter knife banks are identical; however, in different examples the knives of the first counter knife bank may be different from the second counter knife bank, e.g. the length of the knives may be different.

Embodiments and examples of the present invention are advantageous in that they provide a chopper arrangement that allows for finer control over the quality of chopping performed on crop material processed by an agricultural harvester. In particular, the provision of multiple banks of counter knives that can be controlled to be partially engaged to different degrees with the rotating knives of the chopper can lead to a reduction in a step change in chop quality compared to controlling a degree of engagement of a single bank of counter knives.

Embodiments and examples of the present invention are advantageous in that they provide a chopper arrangement that exhibits reduced knife wear compared with known arrangements. In particular, by providing multiple banks of counter knives that may each partially overlap the rotating knives in order to obtain an equivalent chop intensity or chop quality provided by a single bank of counter knives that are fully engaged, for instance, the knives of each of the multiple counter knife banks suffer from reduced wear, thus increasing their useful lifespan and reducing the frequency with which they need to be replaced.

Embodiments and examples of the present invention can increase the power effectiveness or efficiency of a chopper arrangement for an agricultural harvester. In particular, using multiple banks of counter knives, possibly at a reduced level of engagement, instead of a single bank of counter knives to obtain a desired quality of chopping may lead to a chopper arrangement that requires less power, thus freeing up (a potentially significant amount of) power to increase throughput of the harvester, for instance. Furthermore, the provision of a chopper arrangement having multiple banks of counter knives controlled by a single actuator or actuation command can also lead to reduced power consumption. Such a chopper arrangement with a single actuator leads to an arrangement that is simple to operate, allowing easy control of chop intensity or chop quality.

What is claimed is:

1. A chopper arrangement for an agricultural harvester, the chopper arrangement comprising:
- a housing;
- a plurality of rotatable knife rows in the housing, the plurality of rotatable knife rows rotatable about a knife row axis to move crop material in the housing along a crop flow path; and
- a counter knife arrangement movable between an engaged position and a disengage position, the counter knife arrangement comprising:
  - a first counter knife bank rotatable about a first counter knife bank axis, the first counter knife bank axis positioned vertically above the first counter knife bank and the knife row axis;
  - a second counter knife bank rotatable about a second counter knife bank axis and downstream of the first counter knife bank according to the crop flow path, the second counter knife bank axis positioned below the knife row axis;
  - a mechanical linkage coupling the first counter knife bank to the second counter knife bank to provide for simultaneous movement of the first counter knife bank and the second counter knife bank upon actuation of the counter knife arrangement between the engaged position and the disengaged position,
- wherein in the engaged position the first counter knife bank and the second counter knife bank at least partially overlap the plurality of rotatable knife rows, and
- wherein in the disengaged position the first counter knife bank and the second counter knife bank are retracted away from the plurality of rotatable knife rows.

2. The chopper arrangement according to claim 1, wherein the mechanical linkage comprises:
- a first bracket fixedly attached to the first counter knife bank and pivotably attached to the housing, and
- a second bracket fixedly attached to the second counter knife bank and pivotably attached to the housing,
- wherein the first bracket and the second bracket are arranged to pivot relative to the housing upon actuation of the counter knife arrangement between the engaged position and the disengaged position.

3. The chopper arrangement according to claim 2, wherein the mechanical linkage further comprises an elongate connector having a first connector end and a second connector end opposite the first connector end, the elongate connector being pivotably attached to the first bracket at the first connector end and being pivotably attached to the second bracket at the second connector end to provide for relative rotational movement between the first bracket and the second bracket upon actuation of the counter knife arrangement between the engaged position and the disengaged position.

4. The chopper arrangement according to claim 2, wherein the chopper arrangement comprises an actuating arm pivotably attached to the housing, the actuating arm and the first bracket being pivotably attached to the housing at a common pivot point, wherein actuation of the actuating arm about the common pivot point causes actuation of the first bracket about the common pivot point to move the counter knife arrangement between the engaged position and the disengaged position.

5. The chopper arrangement according to claim 4, wherein the actuating arm includes a first actuating arm at a first side of the first counter knife bank and the second counter knife bank and a second actuating arm at a second side of the first counter knife and the second counter knife bank opposite the first side.

6. The chopper arrangement according to claim 4, wherein an operator rotates the actuating arm.

7. The chopper arrangement according to claim 1, wherein, in the engaged position of the counter knife arrangement, a degree of overlap between the first counter knife bank and the plurality of rotatable knife rows is greater than a degree of overlap between the second counter knife bank and the plurality of rotatable knife rows.

8. The chopper arrangement according to claim 1, wherein in a first range of positions of the counter knife arrangement between a first intermediate position and a second intermediate position of the counter knife arrangement, the first intermediate position and the second intermediate position being between the engaged position and the disengaged position, the first counter knife bank partially overlaps the plurality of rotatable knife rows and the second counter knife bank does not overlap the plurality of rotatable knife rows.

9. The chopper arrangement according to claim 8, wherein in a second range of positions of the counter knife arrangement between the second intermediate position and the engaged position of the counter knife arrangement, the second intermediate position being between the first intermediate position and the engaged position, the second counter knife bank at least partially overlaps the plurality of rotatable knife rows.

10. The chopper arrangement according to claim 8, wherein in the second intermediate position a degree of overlap between the first counter knife bank and the plurality of rotatable knife rows is less than 50%.

11. The chopper arrangement according to claim 1, wherein an angle of overlap between the first counter knife bank and the plurality of rotatable knife rows is different for different positions of the counter knife arrangement.

12. The chopper arrangement according to claim 11, wherein the angle of overlap between the first counter knife bank and the plurality of rotatable knife rows is smallest when the counter knife arrangement is in the engaged position.

13. The chopper arrangement according to claim 11, wherein the angle of overlap between the first counter knife bank and the plurality of rotatable knife rows is different from an angle of overlap between the second counter knife bank and the plurality of rotatable knife rows in a given position of the counter knife arrangement.

14. A method of operating a chopper arrangement for an agricultural harvester, the chopper arrangement comprising a counter knife arrangement having a first counter knife bank and a second counter knife bank that are mechanically coupled together, the counter knife arrangement being movable between an engaged position, in which the first counter knife bank and the second counter knife bank at least partially overlap a plurality of rotatable knife rows of the chopper arrangement, and a disengaged position, in which the first counter knife bank and the second counter knife bank are retracted away from the plurality of rotatable knife rows, the method comprising:

actuating the counter knife arrangement to a position between the engaged position and the disengaged position to control an intensity of chopping performed on crop material processed by the agricultural harvester, wherein actuation of the counter knife arrangement causes simultaneous movement of the first counter knife bank and the second counter knife bank between the engaged position and the disengaged position by rotating the first knife bank about a first counter knife bank axis positioned above the first counter knife bank and the second knife bank about a second counter knife bank axis positioned above the second counter knife bank.

15. A chopper arrangement for an agricultural harvester, the chopper arrangement comprising:

a housing;

a plurality of rotatable knife rows in the housing, the plurality of rotatable knife rows rotatable about an axis to move crop material in the housing along a crop flow path; and a counter knife arrangement movable between an engaged position and a disengage position, the counter knife arrangement comprising:

a first counter knife bank;

a second counter knife bank downstream of the first counter knife bank according to the crop flow path;

a first bracket having a first end portion pivotably attached to the housing, wherein the first counter knife bank is operably coupled with the first bracket at an intermediate portion of the first bracket;

a second bracket fixedly attached to the second counter knife bank on a first end portion and pivotably attached to the housing at an intermediate portion of the second bracket; and a mechanical linkage coupled to the first bracket at a second end portion on an opposing side of the first counter knife bank and to the second bracket at a second end portion on an opposing side of the second bracket pivot point from the second counter knife bank, the mechanical linkage configured to provide for simultaneous movement of the first counter knife bank and the second counter knife bank upon actuation of the counter knife arrangement between the engaged position and the disengaged position.

* * * * *